US012079653B2

(12) United States Patent
Thomas et al.

(10) Patent No.: US 12,079,653 B2
(45) Date of Patent: Sep. 3, 2024

(54) DISTRIBUTED STATE STORE SUPPORTING MULTIPLE PROTOCOLS

(71) Applicant: Hewlett Packard Enterprise Development LP, Houston, TX (US)

(72) Inventors: Skyler Thomas, Santa Clara, CA (US); Lars Fredriksen, Downers Grove, IL (US); Ted Dunning, Santa Clara, CA (US); Scott Frolich, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 527 days.

(21) Appl. No.: 17/494,059

(22) Filed: Oct. 5, 2021

(65) Prior Publication Data

US 2023/0103402 A1    Apr. 6, 2023

(51) Int. Cl.
*G06F 9/54* (2006.01)
*G06F 9/455* (2018.01)
*G06F 16/182* (2019.01)

(52) U.S. Cl.
CPC ...... *G06F 9/45558* (2013.01); *G06F 9/45516* (2013.01); *G06F 16/182* (2019.01); *G06F 2009/45562* (2013.01); *G06F 2009/4557* (2013.01)

(58) Field of Classification Search
CPC .. G06F 9/455; G06F 9/45504; G06F 9/45533; G06F 9/45537; G06F 9/45545; G06F 9/541
See application file for complete search history.

(56) References Cited

U.S. PATENT DOCUMENTS

| | | | |
|---|---|---|---|
| 10,356,048 B2 * | 7/2019 | Zhao | H04L 63/029 |
| 10,841,226 B2 | 11/2020 | Mariappan et al. | |
| 11,055,273 B1 * | 7/2021 | Meduri | G06F 16/2358 |
| 11,231,919 B2 * | 1/2022 | Gonzalez | G06F 8/61 |
| 11,316,947 B2 * | 4/2022 | Sterbling | H04L 67/2885 |
| 2019/0379590 A1 | 12/2019 | Rimar et al. | |
| 2020/0034240 A1 | 1/2020 | Natanzon et al. | |
| 2020/0034254 A1 | 1/2020 | Natanzon | |
| 2020/0073692 A1 | 3/2020 | Rao et al. | |
| 2020/0076685 A1 | 3/2020 | Vaidya et al. | |
| 2020/0112487 A1 | 4/2020 | Inamdar et al. | |
| 2020/0133789 A1 | 4/2020 | Natanzon et al. | |
| 2020/0241864 A1 | 7/2020 | Duvur et al. | |
| 2020/0278892 A1 | 9/2020 | Nainar et al. | |

* cited by examiner

*Primary Examiner* — Andy Ho
(74) *Attorney, Agent, or Firm* — Hewlett Packard Enterprise Patent Department (57) ABSTRACT

Examples described herein are generally directed to facilitating access to container state through multiple protocols. According to an example, a distributed state store is provided in which container state is accessible by multiple client containers via nodes of the distributed state store across which the container state is replicated. Responsive to receipt from a first client container of a storage request via a first application programming interface (API) method of the distributed state store that is associated with a first protocol, the container state is stored within the distributed state store. Responsive to receipt from a second client container of an access request via a second API method of the distributed state store that is associated with a second protocol, the container state is returned to the second client container via the second protocol.

20 Claims, 8 Drawing Sheets

DISTRIBUTED STATE STORE SUPPORTING MULTIPLE PROTOCOLS

BACKGROUND

Pods and containers are a way of packaging and deploying various services that make up an application. As opposed to a monolithic application in which all functionalities are packaged together as a unified unit within a single program, containerized applications or microservices are generally broken down into a collection of smaller independent units (e.g., designed to be single-purpose specializing in only one job) that carry out application processes as a separate service. A container includes every dependency (e.g., packages, libraries, and binaries) that an application needs to perform its task. As a result, containerized applications are platform-agnostic and can run directly on any operating system regardless of its version or installed packages, thereby allowing a scheduler associated with a container cluster to freely launch the particular unit of replication (e.g., a container or pod, as the case may be) on any worker node within the container cluster that has a suitable set of information technology (IT) resources.

BRIEF DESCRIPTION OF THE DRAWINGS

Examples described here are illustrated by way of example, and not by way of limitation, in the figures of the accompanying drawings in which like reference numerals refer to similar, though not necessarily identical, elements.

DETAILED DESCRIPTION

Examples described herein are generally directed to facilitating access to container state through multiple protocols. Numerous specific details are set forth in order to provide a thorough understanding of exemplary aspects. It will be apparent, however, to one skilled in the art that examples described herein may be practiced without some of these specific details.

While lifecycle management operations performed by container orchestration systems (e.g., Kubernetes) work well for stateless workloads, container state that may be maintained by a container locally is lost when its encapsulating pod is moved or terminated. This creates a problem (the "state problem") when containers need access to state information created and/or modified by other containers.

While some issues associated with the state problem have been addressed by externalizing container state, for example, via a container storage interface (CSI) that provides Portable Operating System Interface (POSIX)-based access to the container state, in some cases (e.g., an ML pipeline in which tools/processes applied at different stages of the pipeline may utilize distinct protocols) it may be helpful to be able to access shared container state through a variety of different protocols.

In general, examples described herein seek to allow access to container state stored within a single backend (e.g., a distributed data fabric) through multiple protocols. For example, client containers (and other objects) within a container cluster (e.g., a Kubernetes cluster) may access state through various protocols (e.g., CSI/POSIX, Hadoop Distributed Filesystem (HDFS), cloud or object storage protocols (e.g., Simple Storage Service (S3), Hadoop HDFS over Hypertext Transfer Protocol (HTTPFS), Java Database Connectivity (JDBC), Open JavaScript Object Notation (JSON) Application Interface (OJAI), streaming data, and HBase). According to an example, a distributed state store is provided in which container state is accessible by or on behalf of multiple client containers via multiple nodes of the distributed state store across which the container state is replicated. In this manner, a first and second client container may access the same container state via the same or different protocols. For example, responsive to receipt from or on behalf of a first client container of a storage request (e.g., write or store) via a first application programming interface (API) method of the distributed state store that is associated with a first protocol, container state may be stored within the distributed state store. Subsequently, the same container state may be accessed by a second client container by issuing an access request (e.g., read or load) via a second API method of the distributed state store that is associated with a second protocol. As described further below, support for the multiple protocols by the data fabric may involve the use of gateway pods that may translate between a protocol that is not natively supported by (built into) the data fabric pods to one that is natively supported by (built into) the data fabric pods.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not necessarily required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "one example" or "an example" means that a particular feature, structure, or characteristic described in connection with the example can be included in at least one implementation. The appearances of the phrase "in one example" are not necessarily all referring to the same example.

As used herein, "container state" generally refers to any changeable condition or information that may be persisted or temporarily stored. Non-limiting examples of container state include results of internal operations of a container (e.g., raw data, notebooks, training data for a machine-learning (ML) model, ML model files for use in connection with performing testing and/or classification, logs created by distributed training solutions), shared libraries (e.g., Java Archive (JAR) files), interactions with other applications or services, user-set preferences, environment variables, the contents of memory or temporary storage, or files opened, read from, or written to.

Container Cluster

Figure 1:
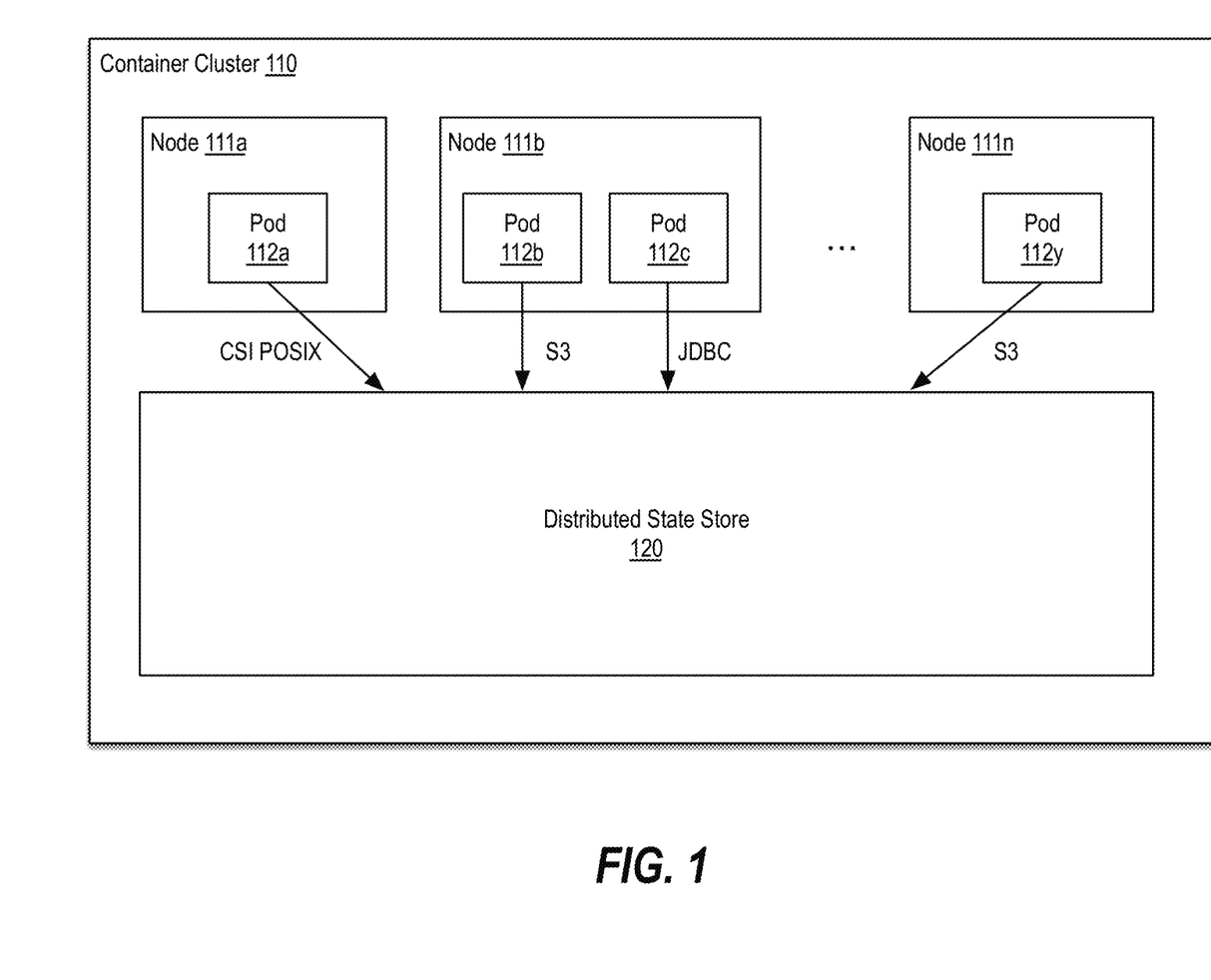
FIG. 1 shows a block diagram conceptually illustrating a container cluster in accordance with an example.

FIG. 1 shows a block diagram conceptually illustrating a container cluster 110 in accordance with an example. In the context of the present example, a number of worker nodes (e.g., nodes 111a-n) of the container cluster 110 (e.g., a Kubernetes cluster) are shown running respective services (e.g., pods 112a-x) that access container state persisted within a distributed state store 120. A non-limiting example of the distributed state store 120 is described further below with reference to FIG. 2.

The services may represent, for example, various stages of an ML pipeline that use different tools/processes to gather, process, label, or annotate container state (e.g., in the form of raw and/or training data for an ML model). Alternatively, the services may represent simulations of different scenarios, for example, based on the same or different container state. Those skilled in the art will appreciate there are numerous other use cases in which it may be desirable to share container state among a number of services. As such, any example use cases described herein are intended to be non-limiting.

As shown in the present example, some services may be constrained in the manner in which they may access externally stored data. For example, certain off-the-shelf tools/processes for use in connection with particular ML pipeline stages may assume external data is accessible via one or more predetermined protocols (e.g., CSI/POSIX, S3, JDBC, etc.). As such, it would be desirable to allow container state to be created, read, updated, and/or deleted via multiple protocols.

While in the current example, the distributed state store 120 and the worker nodes associated with a particular application are shown as being operable within the same container cluster, which may be advantageous for data locality, in alternative implementations, the distributed state store pods (not shown) and the client pods may be separated into different container clusters and may be geographically diverse.

Data Fabric

Figure 2:
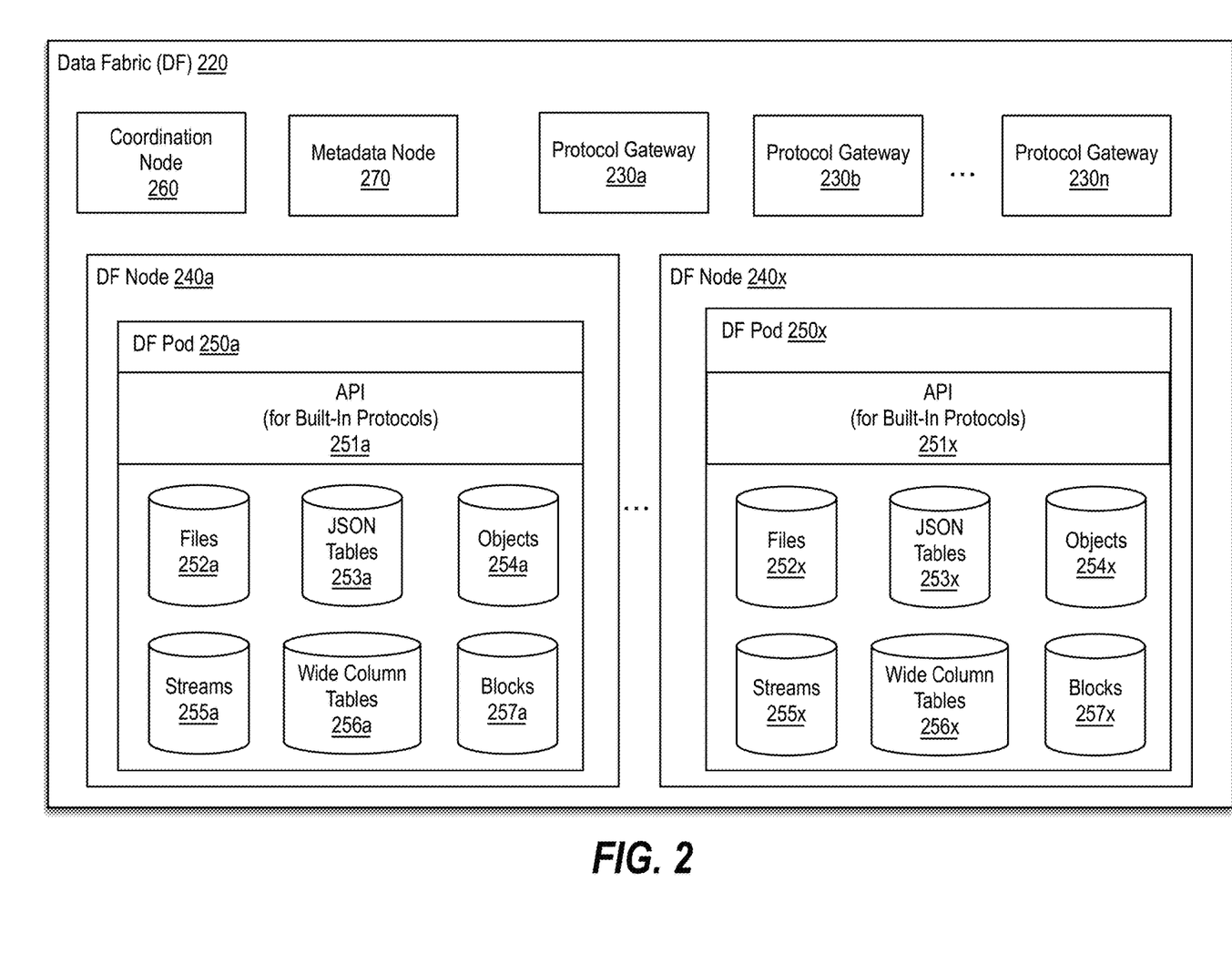
FIG. 2 shows a block diagram conceptually illustrating a data fabric in accordance with an example.

FIG. 2 shows a block diagram conceptually illustrating a data fabric 220 in accordance with an example. The data fabric 220 may represent a non-limiting example of the distributed state store 120 of FIG. 1. In the context of the present example, the data fabric includes multiple protocol gateways 230a-n, a coordination server (e.g., coordination node 260), a metadata server (e.g., metadata node 270), and multiple data fabric (DF) nodes 240a-x. The container platform (e.g., Kubernetes) may be relied upon to perform orchestration of the pods for the protocol gateways 230a-n.

In one example, the DF nodes 240a-x may be virtual or physical machines (e.g., general purpose computer systems and/or high-speed servers) or a combination thereof. Launching the DF pods 250a-x on the DF nodes 240a-x may configure the DF nodes 240a-x to be operable as part of the data fabric 220. For example, the DF pods 250a-x may make use of persistent volumes (PVs) backed by local block devices (e.g., in the form of Hard Disk Drives (HDDs), Solid State Drives (SSDs), Non-Volatile Memory Express (NVMe) SSDs or HDDs, and the like) associated with the DF nodes 240a-x.

In this example, the DF pods 250a-x each respectively include an API 251a-x and multiple types of artifacts (e.g., files 252a-x, JSON tables 253a-x, objects 254a-x, steams 255a-x, wide column tables 256a-x, or blocks 257a-x), thereby making the data persisted within the DF pods 250a-x accessible in a number of data formats (e.g., files, tables, streams, objects, blocks, etc.). In one example, the data is not copied for each of the multiple types of artifacts, but rather is stored in a common format and made accessible in the multiple data formats via different methods provided by the APIs 251a-x. For example, the APIs 251a-x may include create, read, update, and delete (CRUD) operations for each built-in (natively supported) protocol.

Protocol gateways 230a-n may be provided to translate between those protocols not natively supported by the DF pods 250a-x, but that are nonetheless supported by the data fabric 220. For example, as described further below with reference to FIG. 7, assuming an object or cloud storage protocol (e.g., S3) is not natively supported by the APIs 251a-x, one of the protocol gateways 230a-n may be responsible for translating S3 protocol requests, for example, received via an API (not shown) implemented by the protocol gateway at issue to corresponding native filesystem requests (e.g., POSIX, JDBC, HDFS, etc.) that are natively supported by the APIs 251a-x.

As will be appreciated, there are various tradeoffs to be considered in connection with determining the line of demarcation between natively-supported and non-natively supported protocols. The decision regarding which protocols to natively support by the APIs 251a-x versus which protocols to translate may be informed by a number of factors including, but not limited to, performance benefits, the degree of code bloat within the APIs 251a-x, and the popularity and/or prevalence of the protocol at issue. In general, protocols that are desired to run faster should be natively supported by the APIs 251a-x, as those translated by the protocol gateways 230a-n are expected to take a performance hit as a result of the intervening translation from the source protocol supported by the protocol gateway to the target protocol supported by the APIs 251a-x.

Advantageously, the use of protocol gateways 230a-n to offload various protocols from the DF pods 250a-x allows a larger range of protocols to be supported by the data fabric 220 without increasing the size and/or complexity of the DF pods 250a-x and their respective APIs 251a-x. Such an architectural allocation of functionality between the APIs 251-x and protocol gateways 230a-n also insulates the DF pods 250a-x from code changes when adding support for state access via newly added non-native protocols and leverages the container orchestration system (e.g., Kubernetes) to handle deployment of respective gateway pods to handle the traffic for non-native protocols. In one example, the protocols natively supported by the APIs 251a-x include CSI/POSIX, HDFS, and HBase and a protocol gateway of protocol gateways 230a-n may be dedicated to each additional protocol (e.g., S3, NFS, OJAI, HTTPFS, and JDBC) desired to be supported by the data fabric 220.

The metadata server may be responsible for replicating the container state across a number of the DF pods 250a-x and maintaining metadata indicative of the DF pods 250a-x on which chunks of respective objects, files, blocks are stored in the common format. For example, the metadata server may replicate data multiple times (e.g., 3 times) to distribute the data and make it accessible throughout the data fabric 220.

The coordination server may be responsible for facilitating the coordination of the various distributed processes running within the data fabric 220. A non-limiting example of a distributed coordination service that may be used by the coordination server is ZooKeeper.

While in the context of the present example, only one coordination server and one metadata server are shown, it is to be appreciated the data fabric 220 may include multiple distributed file metadata servers, node coordination servers, and multiple storage nodes (e.g., DF nodes 240a-x) to support the desired distributed nature of the data fabric 220.

The various nodes and pods (e.g., pods 112a-x, coordination node 260, metadata node 270, protocol gateways 230a-n, DF pods 250a-x) and other functional units described above with reference to FIGS. 1 and 2 and below with reference to FIGS. 4-7 and the processing described below with reference to the flow diagram of FIG. 3 may be implemented in the form of executable instructions stored on a machine readable medium (e.g., a random access memory (RAM), a read-only memory (ROM), an electrically erasable programmable read-only memory (EEPROM), a flash memory, a disk drive, or the like) and executed by a hardware-based processing resource (e.g., a microcontroller, a microprocessor, central processing unit core(s), an application-specific integrated circuit (ASIC), a field programmable gate array (FPGA), or the like) and/or in the form of other types of electronic circuitry. The machine readable medium may be non-transitory. For example, the processing may be performed by one or more computer systems of various forms (e.g., servers, blades, desktop computers, laptop computers), such as the computer system described with reference to FIG. 8 below.

Sharing Container State

Figure 3:
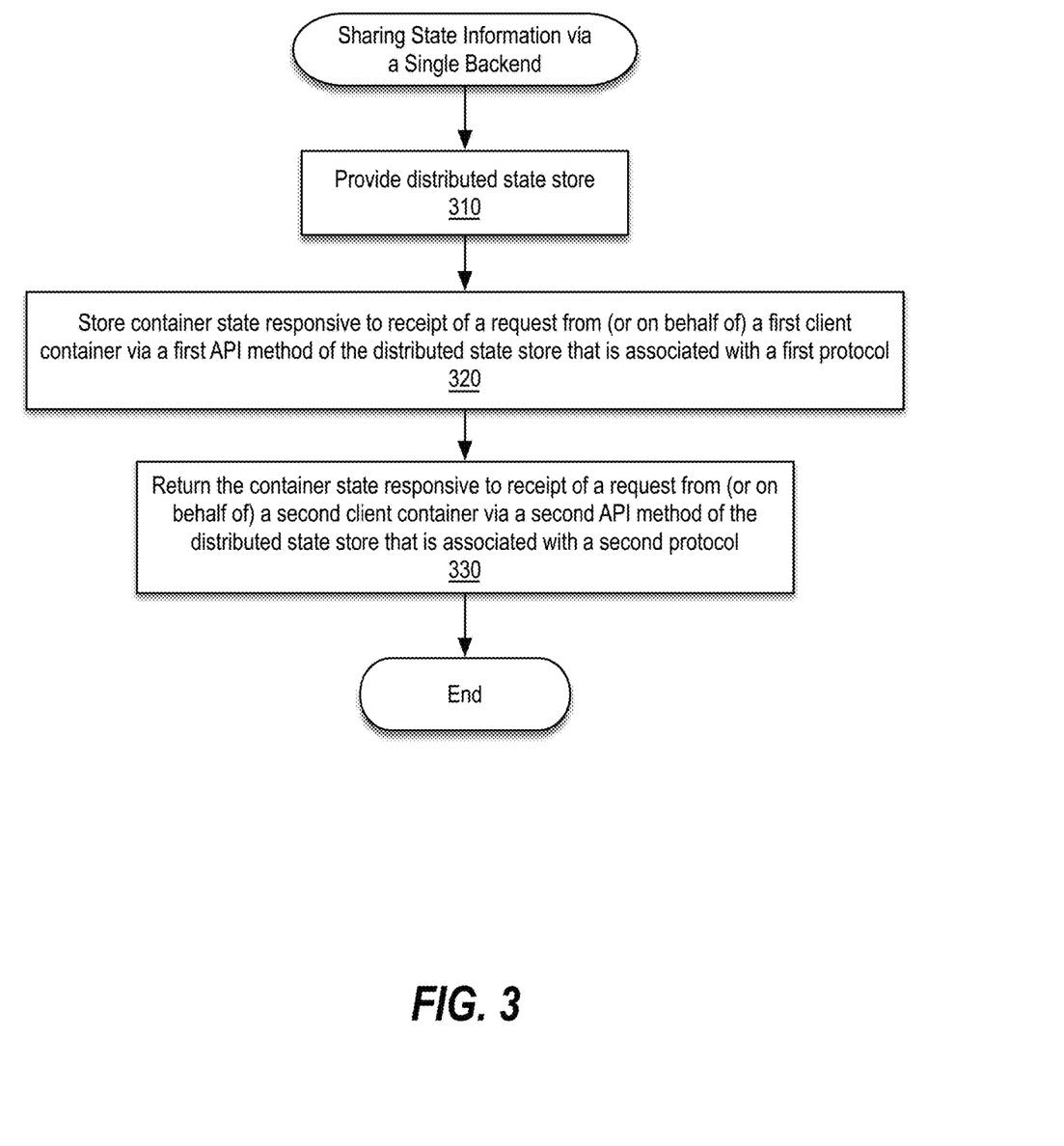
FIG. 3 shows a flow diagram illustrating the sharing of state information via a single backend in accordance with an example.

FIG. 3 shows a flow diagram illustrating the sharing of state information via a single backend (e.g., distributed state store 120) in accordance with an example. While other usage models are contemplated, in one non-limiting usage model, multiple client containers (e.g., containers associated with pods 112a-x) may represent various stages of an ML pipeline that make use of different tools/processes to gather, process, label, and/or annotate, container state (e.g., in the form of raw data and/or training data for an ML model).

At block 310, a distributed state store is provided for storage of container state that may be shared among the multiple client containers. The distributed state store may be built within a container cluster (e.g., container cluster 110) by configuring the coordination, metadata, and protocol gateway nodes shown in FIG. 2 and launching data fabric pods (e.g., DF pods 250a-x) on various nodes of the container cluster to configure them as data fabric nodes (e.g., DF nodes 240a-x) that are part of the distributed state store.

At block 320, container state is stored within the distributed state store responsive to receipt of a request from (which may include the request being on behalf of) a first client container via a first API method of the distributed state store that is associated with a first protocol. As noted above, a metadata server (e.g., metadata node 270) may replicate container state across a number of the data fabric pods and may maintain information regarding on which of the data fabric pods a copy of the requested container state is stored. As such, to the extent the storage request represents an update or modification to existing container state, the metadata server may be used to facilitate direction of the request to an appropriate one of the data fabric pods having a copy of the existing container state. Depending upon the particular implementation (e.g., whether the first protocol is natively supported by the data fabric pods or supported by a translation to a natively supported protocol by a protocol gateway (e.g., one of protocol gateways 230a-n)), the first API method (e.g., a CRUD operation associated with the first protocol) may be implemented by a data fabric pod or by a protocol gateway. In the case of the former (i.e., first protocol is natively supported), the data fabric pod may store the received container state in a common format that is accessible in multiple data formats, for example, as described further below with reference to FIGS. 4-6. In the case of the latter (i.e., first protocol is supported by translation), the protocol gateway may first translate the request from the first protocol to a corresponding request of a natively supported protocol (e.g., built into APIs 251a-x), for example, as described further below with reference to FIG. 7.

At block 330, the container state is returned to a second client container responsive to receipt of a request from (which may include the request being on behalf of) the second client container via a second API method of the distributed state store associated that is with a second protocol. As noted above in connection with block 320, the request may be directed based on metadata maintained by the metadata server indicative of one or more data fabric pods on which a copy of the requested container state is stored. Also, similar to the first protocol, the second protocol may be one natively supported by the data fabric pods or it may be supported by a protocol gateway (e.g., one of protocol gateways 230a-n), performing a translation from the second protocol to a natively supported protocol of the data fabric pod having a copy of the container state at issue. As part of returning the requested container state to the second client, the container state may be retrieved in the form of a common format (e.g., chunks) in which all container state is stored within the distributed state store and transformed to a data format (e.g., file(s), table(s), object(s), or block(s) as the case may be) appropriate for the second protocol.

While in the context of the present example, a number of enumerated blocks are included, it is to be understood that examples may include additional blocks before, after, and/or in between the enumerated blocks. Similarly, in some examples, one or more of the enumerated blocks may be omitted or performed in a different order.

While for purposes of illustration in the context of the present example, two client containers are described as having access to shared state information (with one storing container state through a first protocol and one retrieving container state through a second protocol) via a single backend, it is to be appreciated depending upon the particular implementation a greater number of client containers, protocols, and CRUD operations may be involved. In other examples, a same client container may access, store, and retrieve the state information using different protocols. Additionally, while the present example is intended to illustrate shared container state may be accessed by multiple client containers through different protocols, it is to be appreciated some subset or all containers involved in the sharing of container state may do so via the same protocol.

Example Use Cases

As noted above, there are various tradeoffs to be considered in connection with determining whether a particular implementation of a data fabric (e.g., data fabric 220) should provide built-in (or native) support for a particular protocol. For example, since an intermediate translation need not be performed by a protocol gateway (e.g., one of protocol gateways 230a-n), performance benefits are expected to be achieved as a result of providing API methods for a particular protocol by the data fabric pods; however, this should be balanced against the popularity and/or prevalence of the protocol at issue, for example, to avoid the production of program code that is unnecessarily long, slow, or otherwise wasteful of resources. For example, protocols expected to be infrequently used may represent candidates for translation by a protocol gateway to maintain a reasonable footprint for data fabric pods. While not intended to be representative of all potential protocols that may be natively supported by the data fabric or all potential protocols for which intermediate translation may be performed to a natively-supported protocol, FIGS. 4-7 illustrate how protocol requests may be processed for various example use cases.

Figure 4:
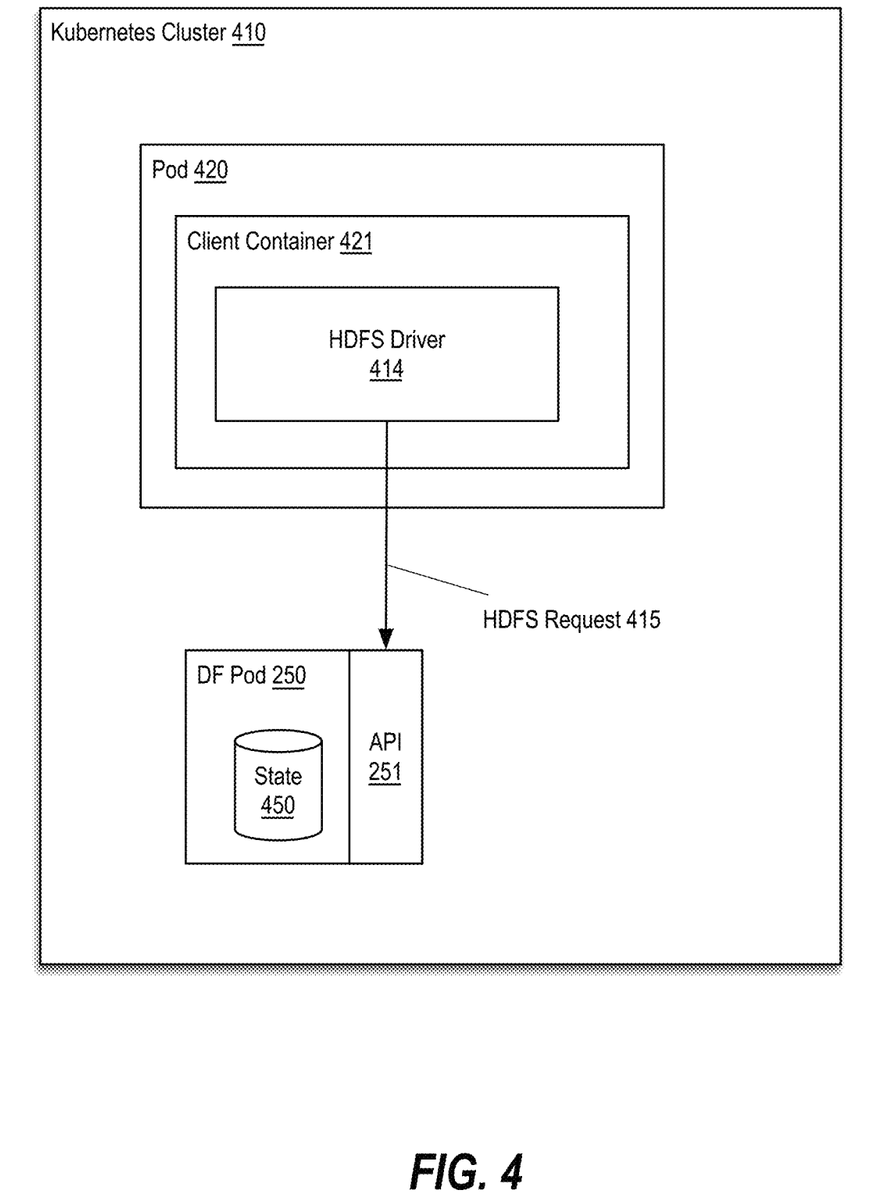
FIG. 4 shows a block diagram illustrating a first example use case involving a first protocol natively supported by a data fabric in accordance with an example.

FIG. 4 shows a block diagram illustrating a first example use case involving a first protocol natively supported by a data fabric in accordance with an example. In the context of the present example, the HDFS protocol is natively supported by the data fabric (e.g., data fabric 220) of a container cluster (e.g., Kubernetes cluster 410) as a result of the APIs (e.g., APIs 251a-x) of the data fabric pods (e.g., DF pods 250a-x) having API methods (e.g., representing various corresponding CRUD operations) for the HDFS protocol. Since HDFS is a natively-supported protocol, an HDFS request 415 issued by an HDFS driver 414 on behalf of a client container 421 within pod 420 may be processed by the data fabric (to store or access container state (e.g., state 450)) without an intervening translation.

Figure 5:
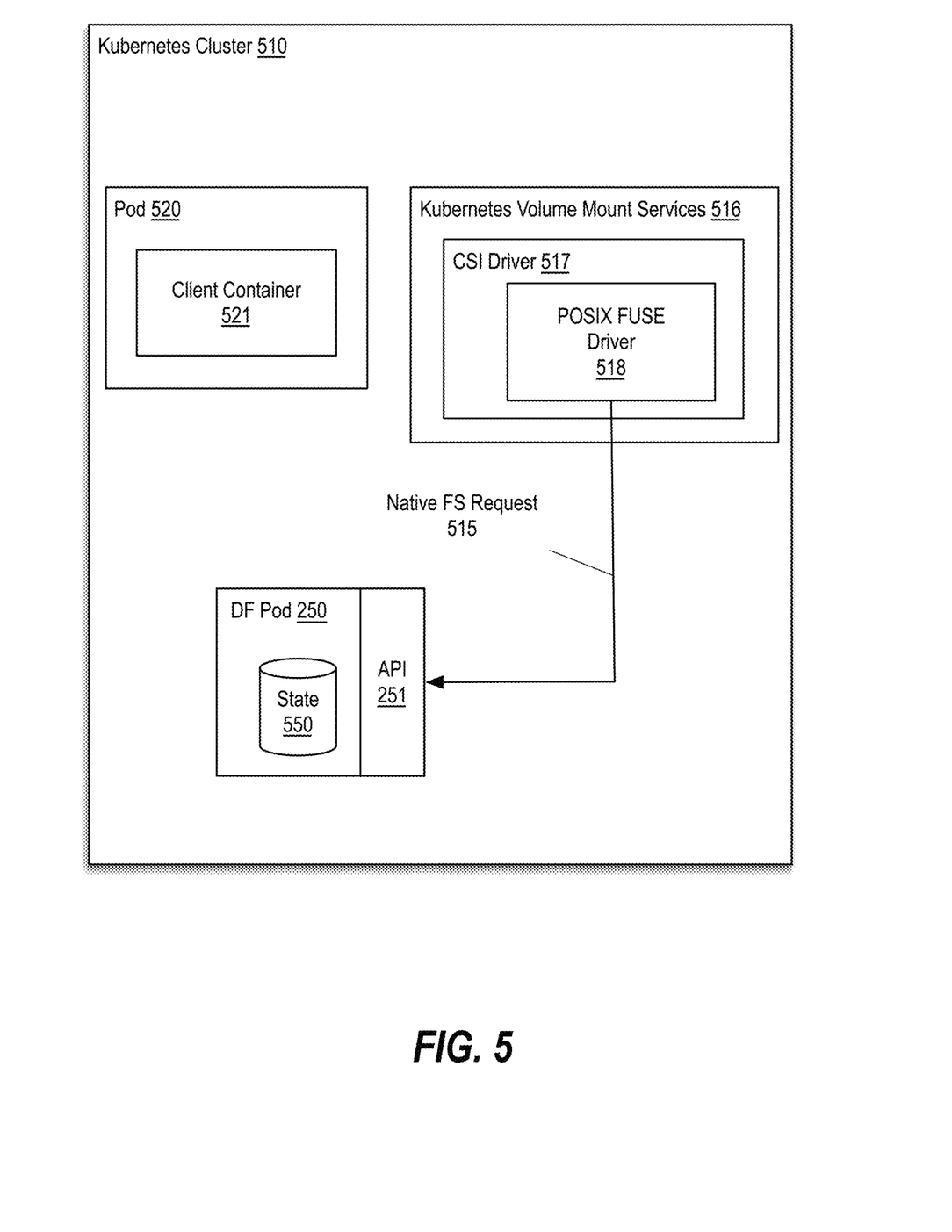
FIG. 5 shows a block diagram illustrating a second example use case involving a second protocol natively supported by a data fabric in accordance with an example.

FIG. 5 shows a block diagram illustrating a second example use case involving a second protocol natively supported by a data fabric in accordance with an example. In the context of the present example, the POSIX protocol is natively supported by the data fabric (e.g., data fabric 220) of a container cluster (e.g., Kubernetes cluster 510) as a result of the APIs (e.g., APIs 251a-x) of the data fabric pods (e.g., DF pods 250a-x) having API methods (e.g., representing various corresponding CRUD operations) for the POSIX protocol. Since POSIX is a natively-supported protocol, a native filesystem (FS) request 515 (e.g., a POSIX request) issued by a POSIX driver (e.g., POSIX FUSE driver 518) implemented within a CSI driver 517 of Kubernetes volume mount services 515 on behalf of a client container 512 within pod 520 may be processed by the data fabric (to store or access container state (e.g., state 550)) without an intervening translation.

Figure 6:
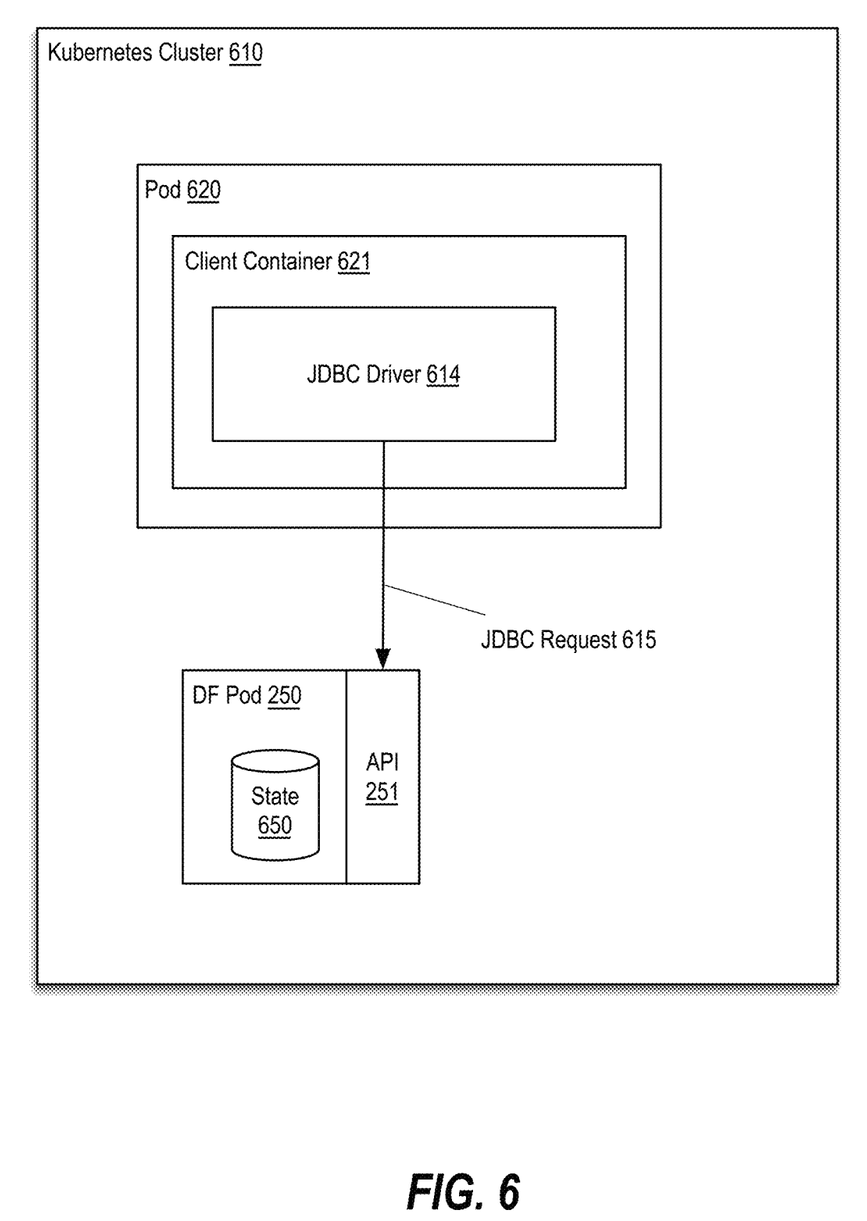
FIG. 6 shows a block diagram illustrating a third example use case involving a third protocol natively supported by a data fabric in accordance with an example.

FIG. 6 shows a block diagram illustrating a third example use case involving a third protocol natively supported by a data fabric in accordance with an example. In the context of the present example, the JDBC protocol is natively supported by the data fabric (e.g., data fabric 220) of a container cluster (e.g., Kubernetes cluster 610) as a result of the APIs (e.g., APIs 251a-x) of the data fabric pods (e.g., DF pods 250a-x) having API methods (e.g., representing various corresponding CRUD operations) for the JDBC protocol. Since JDBC is a natively-supported protocol, a JDBC request 615 issued by a JDBC driver 614 on behalf of the client container may be processed by the data fabric (to store or access container state (e.g., state 650)) without an intervening translation.

Figure 7:
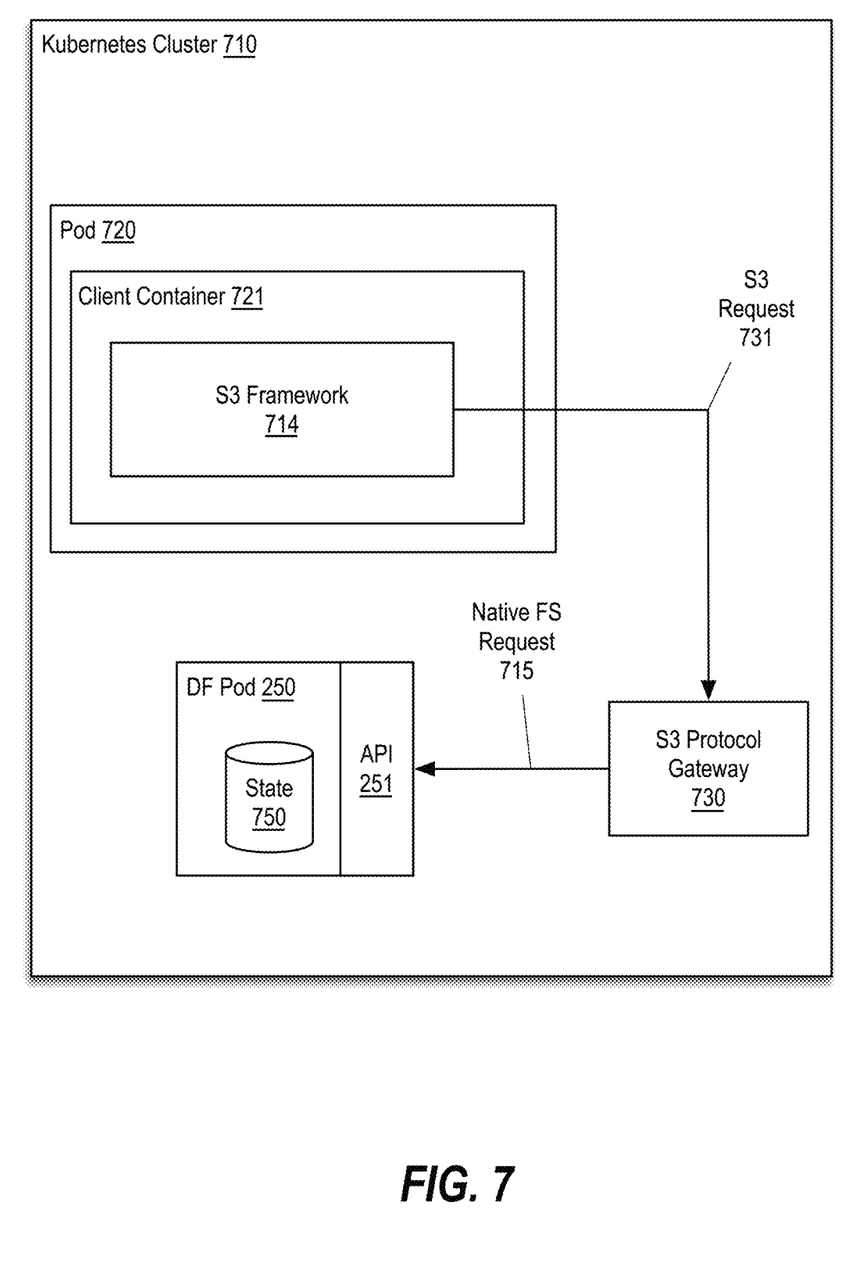
FIG. 7 shows a block diagram illustrating an example use case involving a protocol that is not natively supported by a data fabric in accordance with an example.

FIG. 7 shows a block diagram illustrating an example use case involving a protocol that is not natively supported by a data fabric in accordance with an example. In the context of the present example, the S3 protocol is not natively supported by the data fabric (e.g., data fabric 220) of a container cluster (e.g., Kubernetes cluster 710), which means the APIs (e.g., APIs 251a-x) of the data fabric pods (e.g., DF pods 250a-x) do not implement API methods for the S3 protocol. Since the S3 protocol is not a natively-supported protocol, an S3 request 731 issued by an S3 framework 714 on behalf of a client container 721 within pod 720 is first processed by an S3 protocol gateway 730 (e.g., corresponding to one of protocol gateways 230a-n) to translate the S3 request 731 into a corresponding request (e.g., native FS request 715) that is natively supported by the APIs of the data fabric pods to facilitate storage of or access to container state (e.g., state 750).

Example Computer System

Figure 8:
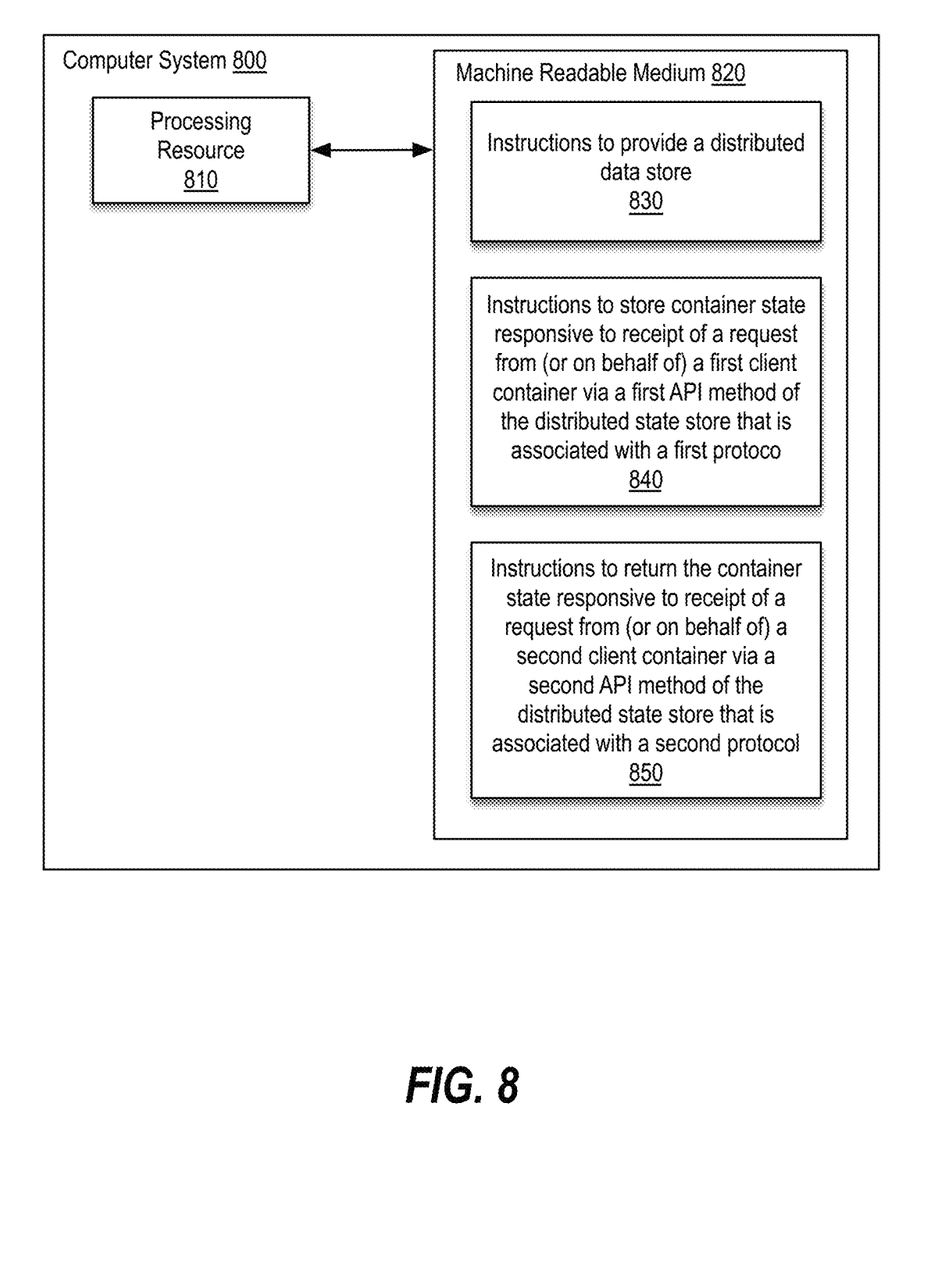
FIG. 8 shows a block diagram of a computer system in accordance with an example.

FIG. 8 shows a block diagram of a computer system in accordance with the first example. In the example illustrated by FIG. 8, computer system 800 includes processing resource 810 coupled to non-transitory, machine readable medium 820 encoded with instructions to perform one or more processes described herein. Computer system 800 may be a server, a storage array, a cluster of servers, a computer appliance, a workstation, a converged system, a hyperconverged system, or the like.

Processing resource 810 may include a microcontroller, a microprocessor, CPU core(s), GPU core(s), an ASIC, an FPGA, and/or other hardware device suitable for retrieval and/or execution of instructions from machine readable medium 820 to perform the functions related to various examples described herein. Additionally or alternatively, processing resource 810 may include electronic circuitry for performing the functionality of the instructions described herein.

Machine readable medium 820 may be any medium suitable for storing executable instructions. Non-limiting examples of machine readable medium 820 include RAM, ROM, EEPROM, flash memory, a hard disk drive, an optical disc, or the like. Machine readable medium 820 may be disposed within computer system 800, as shown in FIG. 8, in which case the executable instructions may be deemed "installed" or "embedded" on computer system 800. Alternatively, machine readable medium 820 may be a portable (e.g., external) storage medium, and may be part of an "installation package." The instructions stored on machine readable medium 820 may be useful for implementing at least part one or more of the methods described herein.

In the context of the present example, machine readable medium 820 is encoded with a set of executable instructions 830-850. It should be understood that part or all of the executable instructions and/or electronic circuits included within one block may, in alternate implementations, be included in a different block shown in the figures or in a different block not shown.

Instructions 830, upon execution, may cause processing resource 810 to provide a distributed data store (e.g., distributed data store 120). In one example, instructions 830 may be useful for performing block 310 of FIG. 3.

Instructions 840, upon execution, may cause processing resource 810 to store container state responsive to receipt of a request from (or on behalf of) a first client container (e.g., a container associated with one of pods 112a-x) via a first API method (e.g., a method implemented by one of APIs 251a-x or by an API implemented by one of protocol gateways 230a-x) of the distributed state store that is associated with a first protocol. In one example, instructions 840 may be useful for performing block 320 of FIG. 3.

Instructions 850, upon execution, may cause processing resource 810 to return container state responsive to receipt of a request from (or on behalf of) a second client container (e.g., a container associated with one of pods 112a-x) via a second API method (e.g., a method implemented by one of APIs 251a-x or by an API implemented by one of protocol gateways 230a-x) of the distributed state store that is associated with a second protocol. In one example, instructions 850 may be useful for performing block 330 of FIG. 3.

In the foregoing description, numerous details are set forth to provide an understanding of the subject matter disclosed herein. However, implementation may be practiced without some or all of these details. Other implementations may include modifications, combinations, and variations of the details discussed above. It is intended that the following claims cover such modifications, combinations, and variations.

What is claimed is:

1. A method:
providing a distributed state store in which container state is accessible by a plurality of client containers via a plurality of nodes of the distributed state store across which the container state is replicated, the distributed state store supporting multiple protocols via protocol gateways and native protocol support;
responsive to receipt from a first client container of the plurality of client containers of a storage request via a first application programming interface (API) method of the distributed state store that is associated with a first protocol, storing the container state within the distributed state store; and
responsive to receipt from a second client container of the plurality of client containers of an access request via a second API method of the distributed state store that is associated with a second protocol, returning the container state to the second client container via the second protocol.

2. The method of claim 1, wherein the second API method is implemented by a protocol gateway within the distributed state store, the protocol gateway being operable to translate the second protocol to one of a plurality of built-in protocols natively supported by a first node of the plurality of nodes.

3. The method of claim 2, wherein the second protocol comprises a cloud storage protocol or an object storage protocol.

4. The method of claim 1, wherein the first protocol is one of a plurality of built-in protocols natively supported by a first node of the plurality of nodes and wherein the first API method is implemented by the first node.

5. The method of claim 4, wherein the first protocol comprises Portable Operating System Interface (POSIX) or Hadoop Distributed File System (HDFS).

6. The method of claim 1, wherein the container state is stored by the distributed state store in a common format.

7. A system comprising:
a processing resource; and
a non-transitory computer-readable medium, coupled to the processing resource, having stored therein instructions that when executed by the processing resource cause the processing resource to:
implement a distributed state store that supports multiple protocols via protocol gateways and native protocol support, wherein the distributed data store stores container state accessible by a plurality of client containers via a plurality of nodes of the distributed state store across which the container state is replicated;
responsive to receipt from a first client container of the plurality of client containers of a storage request via a first application programming interface (API) method of the distributed state store that is associated with a first protocol, store the container state within the distributed state store; and
responsive to receipt from a second client container of the plurality of client containers of an access request via a second API method of the distributed state store that is associated with a second protocol, return the container state to the second client container via the second protocol.

8. The system of claim 7, wherein the second API method is implemented by a protocol gateway within the distributed state store, the protocol gateway being operable to translate the second protocol to one of a plurality of built-in protocols natively supported by a first node of the plurality of nodes.

9. The system of claim 8, wherein the second protocol comprises a cloud storage protocol or an object storage protocol.

10. The system of claim 7, wherein the first protocol is one of a plurality of built-in protocols natively supported by a first node of the plurality of nodes and wherein the first API method is implemented by the first node.

11. The system of claim 10, wherein the first protocol comprises Portable Operating System Interface (POSIX) or Hadoop Distributed File System (HDFS).

12. The system of claim 7, wherein the container state is stored by the distributed state store in a common format.

13. A non-transitory machine readable medium storing instructions, which when executed by a processing resource of a computer system, cause the processing resource to:
responsive to receipt from a first client container of a plurality of client containers of a storage request relating to container state via a first application programming interface (API) method of a distributed state store that is associated with a first protocol, store the container state within the distributed state store;
responsive to receipt from a second client container of the plurality of client containers of an access request via a second API method of the distributed state store that is associated with a second protocol, return the container state to the second client container via the second protocol; and
provide protocol gateways within the distributed state store that translate requests via API methods not natively supported by the distributed state store to an API method natively supported by the distributed state store and pass the translated requests to the distributed state store.

14. The non-transitory machine readable medium of claim 13, wherein the instructions further cause the processing resource to make the container state accessible via the distributed state store by replicating the container state among a plurality of nodes of the distributed state store.

15. The non-transitory machine readable medium of claim 13, wherein the second API method is implemented by a protocol gateway within the distributed state store, the protocol gateway being operable to translate the second protocol to one of a plurality of built-in protocols natively supported by a first node of the plurality of nodes.

16. The non-transitory machine readable medium of claim 15, wherein the second protocol comprises a cloud storage protocol or an object storage protocol.

17. The non-transitory machine readable medium of claim 13, wherein the first protocol is one of a plurality of built-in protocols natively supported by a first node of the plurality of nodes and wherein the first API method is implemented by the first node.

18. The non-transitory machine readable medium of claim 17, wherein the first protocol comprises Portable Operating System Interface (POSIX) or Hadoop Distributed File System (HDFS).

19. The non-transitory machine readable medium of claim 13, wherein container state is stored by the distributed state store in a common format.

20. The non-transitory machine readable medium of claim 13, wherein the distributed state store is operable within a first container cluster and the plurality of client containers are operable within a second container cluster.

* * * * *